United States Patent
Hinds

(10) Patent No.: US 10,495,140 B2
(45) Date of Patent: Dec. 3, 2019

(54) REVERSIBLE SPIRAL GROOVE JOURNAL BEARING FOR USE ON STANDARD AND REVERSE ROTATION TURBOCHARGERS

(71) Applicant: BorgWarner Inc., Auburn Hills, MI (US)

(72) Inventor: Shaun C. Hinds, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/301,783

(22) PCT Filed: Apr. 20, 2015

(86) PCT No.: PCT/US2015/026608
§ 371 (c)(1),
(2) Date: Oct. 4, 2016

(87) PCT Pub. No.: WO2015/167844
PCT Pub. Date: Nov. 5, 2015

(65) Prior Publication Data
US 2017/0108035 A1    Apr. 20, 2017

Related U.S. Application Data

(60) Provisional application No. 61/986,512, filed on Apr. 30, 2014.

(51) Int. Cl.
*F16C 17/02* (2006.01)
*F16C 33/10* (2006.01)
(Continued)

(52) U.S. Cl.
CPC .......... *F16C 17/026* (2013.01); *F01D 25/166* (2013.01); *F01D 25/18* (2013.01);
(Continued)

(58) Field of Classification Search
CPC ...... F16C 17/026; F16C 17/24; F16C 33/107; F16C 33/1085; F16C 2360/24
See application file for complete search history.

(56) References Cited

U.S. PATENT DOCUMENTS

| 5,157,292 | A  |   | 10/1992 | Morrill |            |
| 6,450,073 | B1 | * | 9/2002  | Boyer   | F16C 33/107 |
|           |    |   |         |         | 82/129      |

(Continued)

FOREIGN PATENT DOCUMENTS

| JP | 2007046642 A  | 2/2007 |
| WO | 2013106303 A1 | 7/2013 |

OTHER PUBLICATIONS

Written Opinion and International Search Report dated Jul. 20, 2015, in International Application No. PCT/US2015/026608.

*Primary Examiner* — James Pilkington
(74) *Attorney, Agent, or Firm* — Eric L. Doyle; Stephan A. Pendorf; Patent Central LLC

(57) ABSTRACT

A journal bearing (51) has spiral grooves (63, 64) on opposite ends (61, 62) of the journal bearing (51) as to face towards the opposing shaft surface and generate a flow of oil outwardly of the journal bearing (51) during shaft rotation. One bearing end has a clockwise spiral groove (63) which pumps lubricant fluid in a first direction. The opposite bearing end includes a reverse-directed, counterclockwise spiral groove (64) which pumps fluid in a second direction, opposite to the first direction. During clockwise rotation of the shaft (21), the lubricating oil flows in the first and second directions to lubricate the turbine and compressor sides of a turbocharger. The journal bearing (51) also may be flipped endwise so as to function during opposite, counterclockwise shaft rotation.

6 Claims, 5 Drawing Sheets

(51) Int. Cl.
    *F16C 17/18*     (2006.01)
    *F04D 29/056*     (2006.01)
    *F02B 39/14*     (2006.01)
    *F01D 25/16*     (2006.01)
    *F01D 25/18*     (2006.01)
    *F16C 17/24*     (2006.01)
    *F04D 29/053*     (2006.01)
    *F04D 29/063*     (2006.01)

(52) U.S. Cl.
    CPC ............ *F02B 39/14* (2013.01); *F04D 29/053* (2013.01); *F04D 29/056* (2013.01); *F04D 29/063* (2013.01); *F16C 17/02* (2013.01); *F16C 17/18* (2013.01); *F16C 17/24* (2013.01); *F16C 33/107* (2013.01); *F16C 33/1065* (2013.01); *F16C 33/1085* (2013.01); F05D 2220/40 (2013.01); F05D 2230/53 (2013.01); F05D 2240/54 (2013.01); F05D 2240/60 (2013.01); F05D 2250/25 (2013.01); F05D 2250/294 (2013.01); F16C 2360/24 (2013.01)

(56) References Cited

U.S. PATENT DOCUMENTS

| | | | | |
|---|---|---|---|---|
| 8,075,191 | B2* | 12/2011 | Gutknecht | F01D 25/16 384/276 |
| 8,496,452 | B2* | 7/2013 | Marsal | F01D 25/162 384/906 |
| 8,628,247 | B2* | 1/2014 | Uesugi | F01D 25/166 384/397 |
| 2010/0132358 | A1 | 6/2010 | Purdey et al. | |
| 2011/0094223 | A1 | 4/2011 | Lemke et al. | |
| 2017/0028509 | A1* | 2/2017 | Ledger | B23K 26/106 |

\* cited by examiner

REVERSIBLE SPIRAL GROOVE JOURNAL BEARING FOR USE ON STANDARD AND REVERSE ROTATION TURBOCHARGERS

CROSS-REFERENCE TO RELATED APPLICATIONS

This application claims priority to and all the benefits of U.S. Provisional Application No. 61/986,512, filed on Apr. 30, 2014, and entitled "Reversible Spiral Groove Journal Bearing For Use On Standard And Reverse Rotation Turbochargers," which is incorporated herein by reference.

FIELD OF THE INVENTION

The invention relates to a turbocharger with an improved journal bearing and more particularly, to an improved journal bearing in a turbocharger which said bearing has reverse directed spiral grooves on opposite ends.

BACKGROUND OF THE INVENTION

Turbochargers are provided on an engine to deliver air to the engine intake at a greater density than would be possible in a normal aspirated configuration. This allows more fuel to be combusted, thus boosting the engine's horsepower without significantly increasing engine weight.

Generally, turbochargers use the exhaust flow from the engine exhaust manifold, which exhaust flow enters the turbine housing at a turbine inlet, to thereby drive a turbine wheel, which is located in the turbine housing. The turbine wheel provides rotational power to drive the compressor wheel of the turbocharger. This compressed air is then provided to the engine intake as referenced above.

Referring in more detail to a representative turbocharger 10 shown in the cross-sectional view of FIG. 1, the turbocharger 10 includes a turbine housing or casing 12 having a volute 14 extending circumferentially therein, a compressor housing 16 and a compressor volute 17, and a turbine wheel 18 and a compressor wheel 19 that are rotatably connected together by a shaft 21. The shaft 21 is supported by a bearing system 22 which is supported within a central bearing housing 23 disposed between the turbine housing 12 and the compressor housing 16. The bearing housing 23 defines a bearing chamber 24 which extends axially between the compressor housing 16 and turbine housing 12 to allow the shaft 21 to extend axially therebetween so that rotation of the turbine wheel 18 drives rotation of the compressor wheel 19 during operation of the turbocharger 10.

In this illustrated turbocharger, the bearing system 22 typically includes a journal bearing positioned within the bearing chamber 24 to provide radial support to the rotating shaft 21. For reference purposes, the Z direction extends axially along the central axis of shaft 21, while the X and Y directions extend radially outwardly therefrom. An end view of the shaft 21 and turbocharger 10 is viewed along the Z direction while the side view is taken in the X direction. These directions are for reference and viewing purposes and are not intended to be limiting.

Generally, the journal bearing 25 is able to float or move radially to a small extent during shaft rotation. The floating ring bearings 25 function to radially support the shaft 21 and prevent radial contact between the shaft 21 and bearing housing 23 in response to radial loads on the shaft 21.

To dampen the radial and axial movements caused by shaft rotation, a fluid such as oil is supplied to the bearing chamber 24 which oil is able to flow around the journal bearing 25 and shaft 21. The oil is supplied to the bearing chamber 24 through an inlet passage 26 which feeds two oil feed ports 27 that supply oil to the journal bearing 25 in a dual-feed configuration for the bearing housing. The bearing housing may also supply oil in a single-feed configuration. The oil thereby surrounds the outside and inside circumferential surfaces of the journal bearing 25. During shaft rotation, an inner fluid film is formed on the inside bearing surfaces which define a journal bearing supporting the shaft 21 radially. The outside bearing surfaces also have an outer fluid film formed thereabout which provides radial support to the journal bearing 25 relative to an inside surface 28 of the bearing chamber 24. The outer and inner films form between the outer and inner bearing surfaces and the respective chamber surface 28 and outer shaft surface 21A. If desired a thrust bearing may also be provided.

In one known journal bearing, a spiral groove may be provided on the inner bearing surface at one end which serves to pump the oil toward the one end of the journal bearing. The spiral groove opens inwardly in close association with the outer shaft surface and extends lengthwise to the one end which generates an axially directed pumping effect during shaft rotation. The spirals are typically oriented such that when oil is pumped, it is pumped axially along the shaft toward the more critical turbine side of the turbocharger. This can generate an oil starvation issue during cold start due to the pumping effect being directed toward the turbine side and away from the compressor side.

Further, these known journal bearings are usable for one direction of shaft rotation which corresponds with the orientation of the spiral. In other words, the spiral is oriented to pump axially toward the turbine when the shaft rotates in one direction but will function to generate the pumping effect toward the compressor when the shaft rotates in the opposite direction.

As such, disadvantages can still exist with this known bearing configuration.

SUMMARY

The invention relates to an improved journal bearing for a turbocharger wherein the inventive bearing has oppositely oriented spiral grooves provided at each of the opposite ends of the bearing. These spiral grooves reduce sub-synchronous noise wherein subsynchronous vibrations can occur having a frequency that is lower than the rotational frequency of the shaft. Subsynchronous vibrations can be generated in the bearing system of a turbocharger during various operating conditions, including cold starts and light to moderate accelerations. When they occur, subsynchronous vibrations can transmit unwanted noise into a vehicle. To address such vibrations, the reverse spiral groove of the invention alters oil whirl, and thus reduces subsynchronous vibration. Additionally, the reverse spiral grooves pump oil to both the compressor and turbine, particularly during cold starts. More particularly in this bearing design, the journal bearing will have a clockwise spiral groove on one end of the bearing which spiral groove is formed on the inner bearing surface so as to face towards the opposing shaft surface and generate a flow of oil outwardly of the journal bearing during shaft rotation. The flow of oil generated by this clockwise spiral groove therefore is in an outward first direction, for example, towards the turbine side thereof when the shaft rotates in a first direction.

Additionally, the opposite end of the journal bearing includes a reverse directed spiral groove which in this instance would have a counter-clockwise spiral in comparison to the clockwise spiral groove. Essentially, therefore, the spiral groove at one end has a reverse oriented spiral formation in comparison to the spiral groove at the opposite end of the journal bearing. At the opposite second end of the journal bearing, a counter-clockwise groove would generate an outward oil flow in a second direction, opposite to the first direction, which therefore would be directed towards the compressor side of the journal bearing when the shaft rotates in the first direction. Hence, during clockwise rotation of the shaft, the lubricating oil flows outwardly in the first direction towards the turbine side and oppositely in the outward, second direction towards the compressor side. If the shaft were to rotate counter-clockwise in this condition, the grooves would undesirably pump inwardly toward the middle portion of the journal bearing, which could then quickly oil starve the bearing surfaces.

Both ends of the journal bearing have an anti-rotation formation which generally maintains the journal bearing stationery relative to the shaft during shaft rotation. Since the anti-rotation feature is provided at both ends of the journal bearing, the journal bearing can be reversed or flipped end to end and mounted on a shaft in this second orientation. These reverse oriented spiral grooves would then generate an outward oil flow only in the presence of a shaft rotation in the counter-clockwise direction. However, if the shaft rotated clockwise in this second orientation, then the undesirable inward oil flow would occur. Hence, when the journal bearing is in the first orientation, it functions to generate outward flow during clockwise shaft rotation and when the journal bearing is reversed or flipped to the second orientation and mounted on the shaft, the same journal bearing is only operable to generate outward flow during counter-clockwise rotation of the shaft. The journal bearing, therefore, can be used for either clockwise or counter-clockwise shaft rotation and still function in the same manner to generate outward oil flow toward the compressor and turbine.

Since the reverse directed spiral grooves generate outward oil flow toward the compressor and towards the turbine during shaft rotation, the journal bearing provides improved performance, particularly during cold starts since oil flows in both directions along the shaft and subsynchronous noise is reduced. This provides significant advantages over the known bearing configuration described above relative to FIG. 1.

Other objects and purposes of the invention, and variations thereof, will be apparent upon reading the following specification and inspecting the accompanying drawings.

Figure 1:
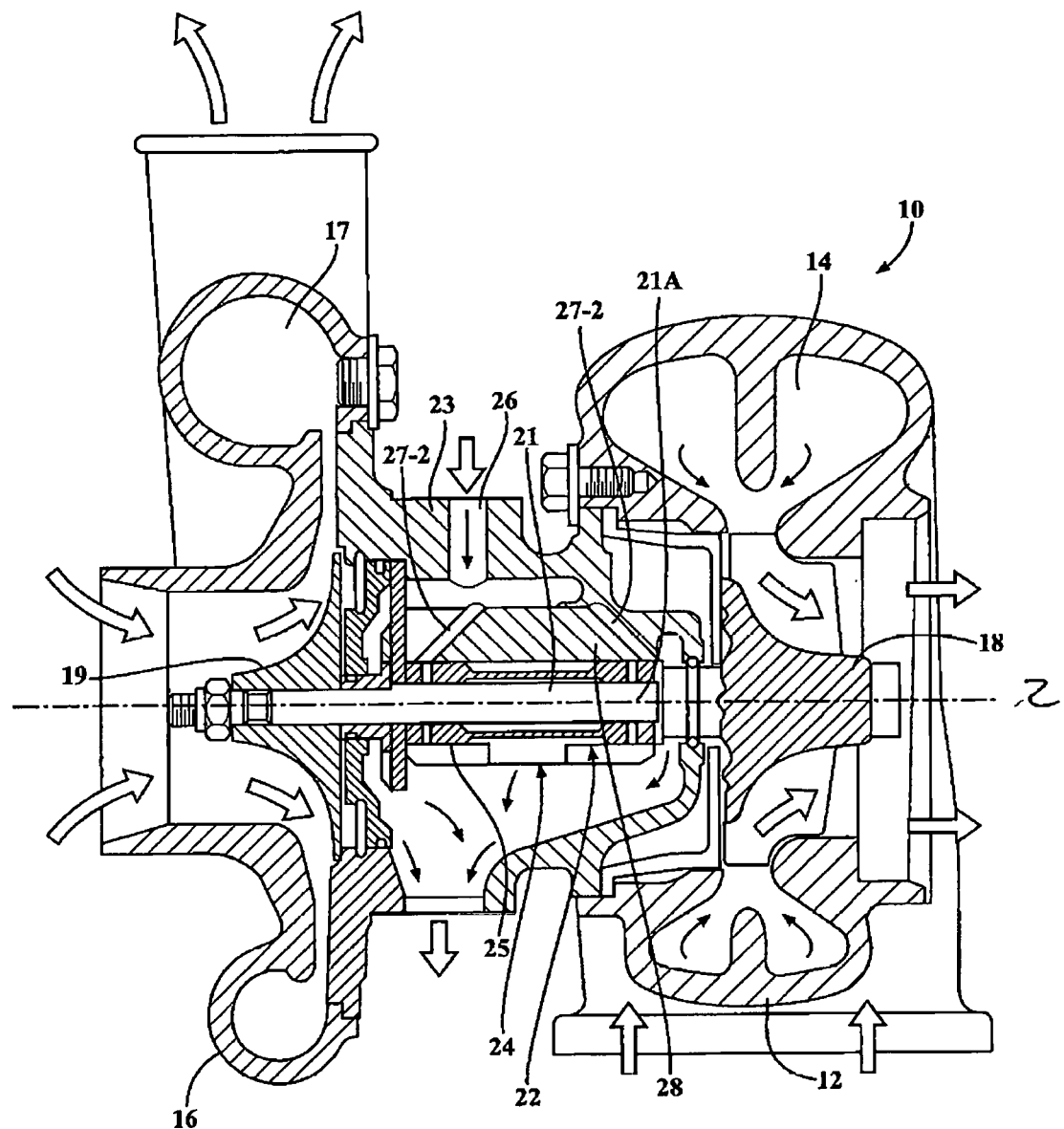
FIG. 1 is a cross-sectional view of a representative turbocharger with a journal bearing.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 2:
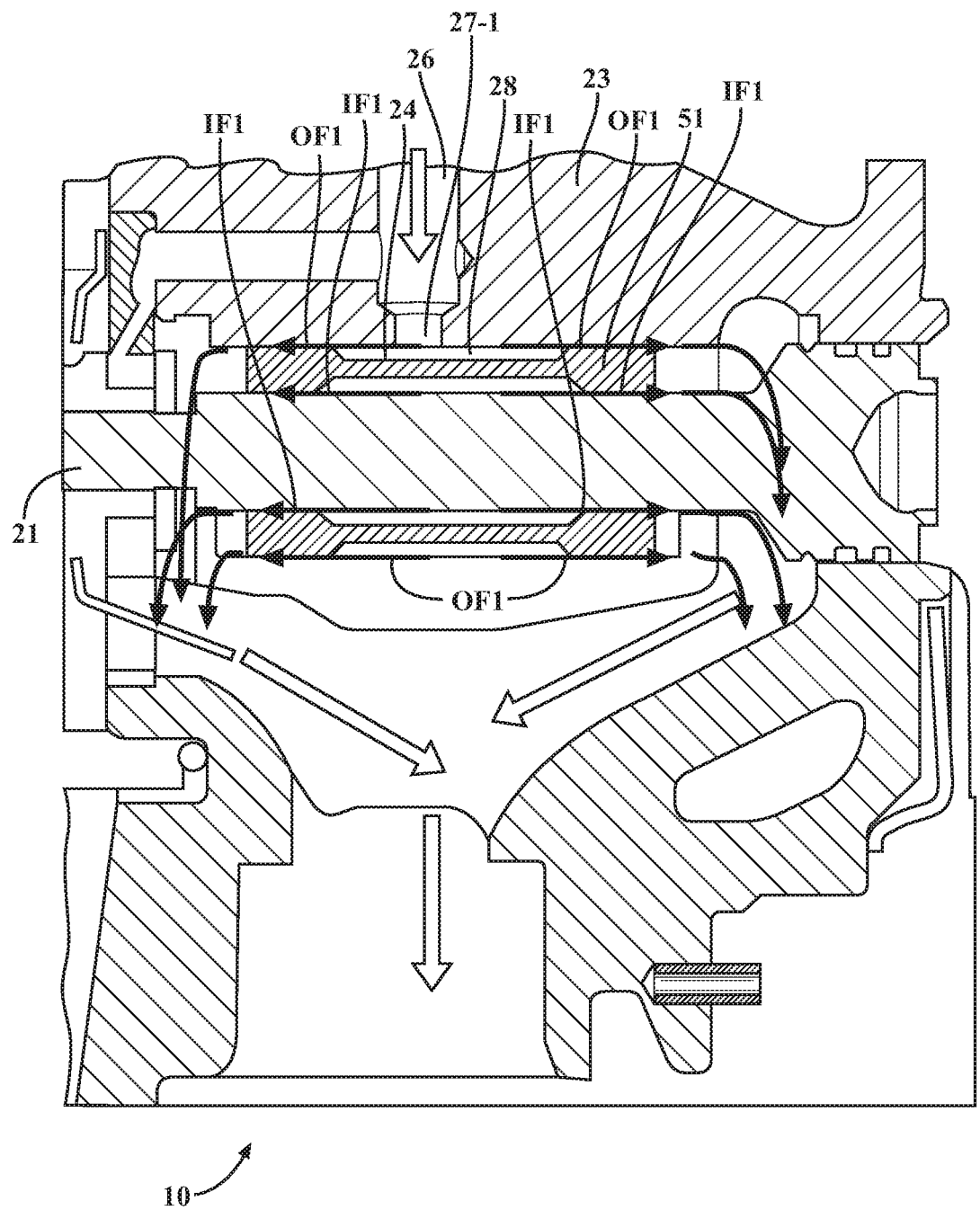
FIG. 2 is a side cross-sectional view of a first embodiment of an inventive journal bearing shown in a bearing housing having a single-feed configuration.
Figure 4:
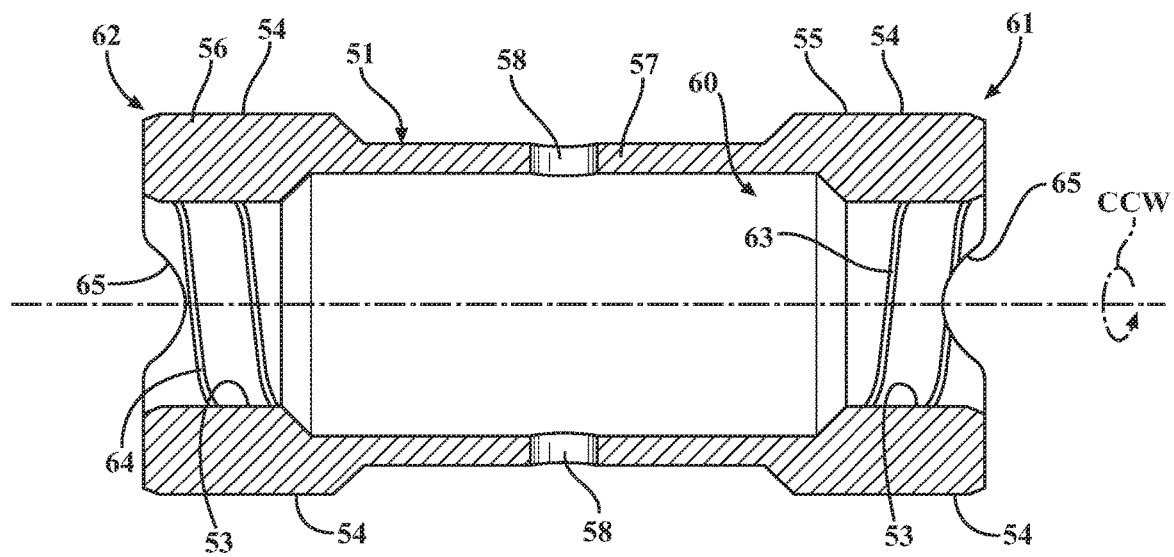
FIG. 4 is a side cross-sectional view of the first embodiment of the inventive journal bearing of FIG. 3 in a second orientation, which is flipped end-wise relative to said first orientation.
Figure 5:
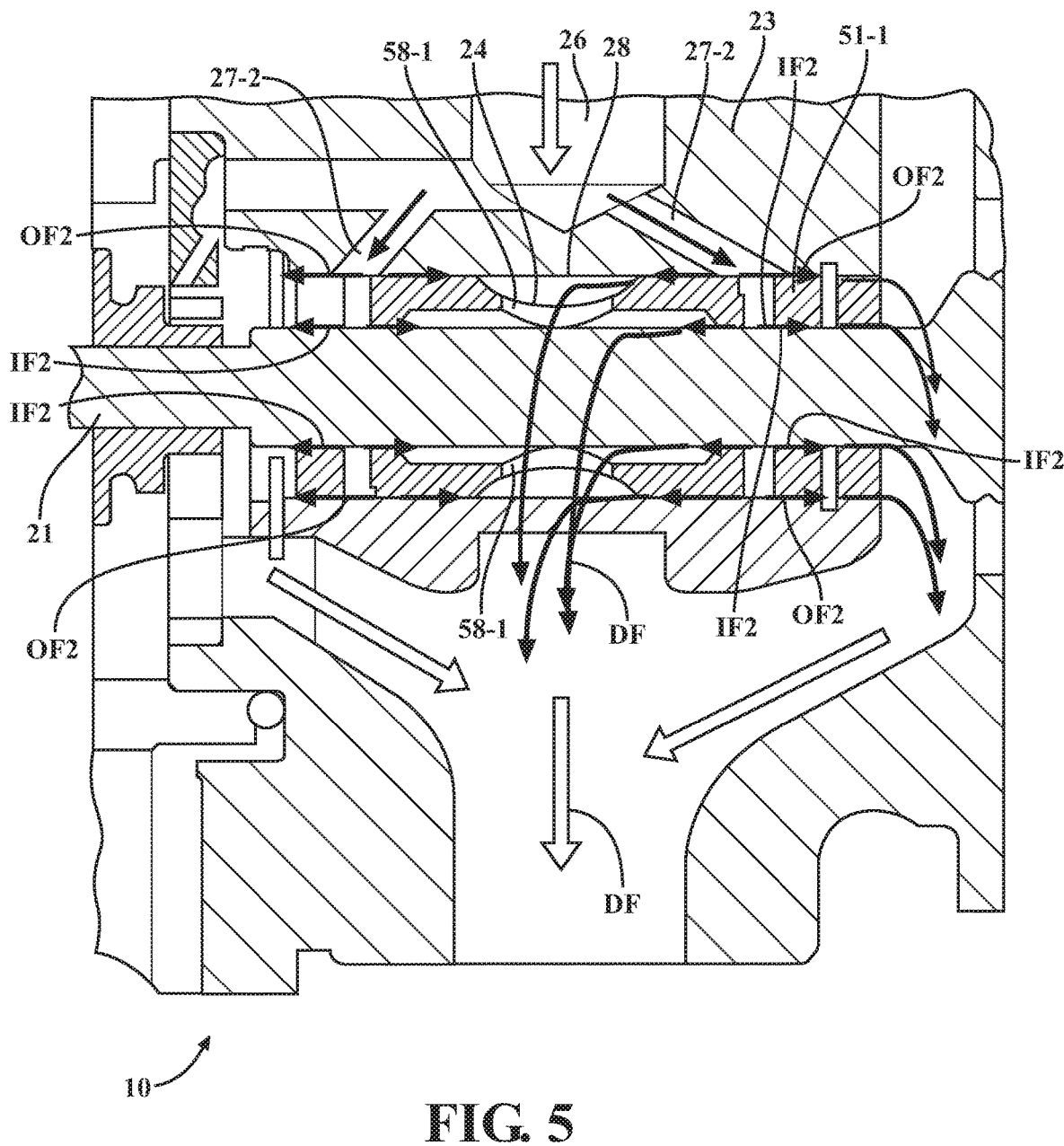
FIG. 5 is a side cross-sectional view of a second embodiment of an inventive journal bearing shown in a bearing housing having a dual-feed configuration.

Referring to FIGS. 2 and 5, the journal bearing 25 of the turbocharger 10 of FIG. 1 is replaced with an inventive journal bearing or bearing unit according to the present invention which is located within a bearing housing 23 to provide radial load support to the shaft 21. The bearing housing 23 and shaft 21 are diagrammatically represented in phantom outline in FIGS. 2 and 5 relative to inventive journal bearings 51 and 51-1. FIG. 1 shows a dual oil feed configuration which preferably would include the bearing unit 51-1 of FIGS. 5-7. If the turbocharger 10 is provided in a single oil feed configuration as seen in FIG. 2, then the bearing unit 51 of FIGS. 2-4 would be provided.

Generally referring to FIGS. 1, 2 and 5, the bearing housing 23 defines the bearing chamber 24, which extends axially through the bearing housing 23 wherein the bearing chamber 24 opens axially towards the turbine wheel 18 and compressor wheel 19. The shaft 21 extends axially through the bearing chamber 24 so that rotation of the turbine wheel 18 rotates the shaft 21 to drive the compressor wheel 19 on the opposite end of the shaft 21. As will be described further hereinafter, in a single oil feed configuration shown in FIG. 2, the inventive bearing unit 51 (FIGS. 2-4) is positioned within the bearing chamber 24 to provide radial support to the rotating shaft 21. In a dual oil feed configuration as shown in FIG. 5, the bearing unit 51-1 (FIGS. 5-7) would preferably be installed.

Figure 3:
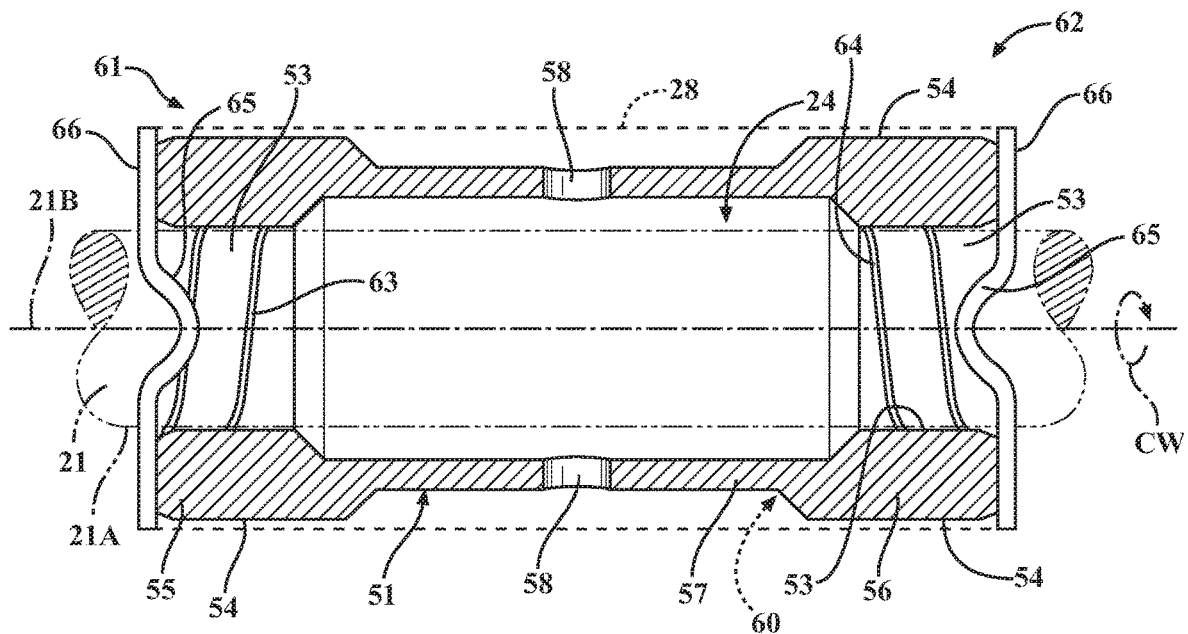
FIG. 3 is a side cross-sectional view of the first embodiment of the inventive journal bearing in a first orientation for use in a single-feed bearing housing.

The bearing housing 23 defines the bearing chamber surface 28, which faces radially inwardly toward and surrounds the shaft 21 in radially spaced relation to define the bearing chamber 24. The shaft 21 extends axially through the bearing chamber 24 and typically rotates in either a clockwise or counterclockwise direction depending upon the design of the turbocharger 10. In FIG. 3, the shaft 21 is indicated relative to the right side thereof as being configured for clockwise (cw) rotation. In comparison, FIG. 4 shows counterclockwise rotation (ccw) as will be discussed further herein. It will be understood that the terms clockwise and counterclockwise are relative terms which depend upon the direction at which the shaft 21 is viewed. As an example, the shaft 21 is viewed from the right turbine side and rotates clockwise, but if this shaft 21 was viewed from the left end of FIG. 3, then the shaft would be seen as rotating counterclockwise. For purposes of this disclosure, a single reference point is taken from the right side of the view wherein shaft rotation in the direction of FIG. 3 is clockwise, and opposite shaft rotation in FIG. 4 is counterclockwise. This convention is also used relative to FIGS. 6 and 7.

In the first embodiment of the invention as shown in FIGS. 3-4, the bearing unit 51 comprises inner and outer bearing surfaces 53 and 54. The bearing unit 51 floats freely within the bearing chamber 24 in surrounding relation to the shaft 21. The outer bearing surfaces 54 face radially outwardly in opposing relation with the inner chamber surface 28 which surfaces are disposed in close but slightly spaced relation to allow formation of an outer fluid film therebetween as shown by arrows OF1 in FIG. 2. During shaft rotation, the fluid film OF1 provides support to the bearing 51 relative to the housing 23.

The inner bearing surfaces 53 (FIGS. 3 and 4) face inwardly toward the outer shaft surface 21A in close but slightly spaced relation to allow static and dynamic formation of an inner fluid film therebetween as shown by arrows IF1 in FIG. 2. As such, the inner fluid film IF1 also has a film stiffness during shaft rotation which acts radially to provide radial support between the bearing 51 and shaft 21. The combination of the inner and outer fluid films IF1 and OF1 provides support to the shaft 21 to counteract journal loads oriented radially relative to the shaft axis 21B.

As to the fluid film, oil or any other suitable fluid is supplied to the bearing chamber 24. The oil is able to flow around the journal bearing 51 and thereby flow along the inner and outer bearings surfaces 53 and 54 to allow formation of the inner and outer fluid films IF1 and OF1 during shaft rotation. The oil is supplied to the bearing chamber 24 from an inlet passage 26 (FIGS. 1, 2 and 4) which feeds the one oil feed port 27-1 (FIG. 2) that supplies oil to the journal bearing 51 in the single oil feed configuration (FIGS. 2-4). As will be described further below, the oil may also be supplied to the two oil feed ports 27-2 (FIGS. 1 and 5) that supply oil to the journal bearing 51-1 in the dual oil feed configuration (FIGS. 1 and 5-7).

Referring again to the single feed configuration of FIGS. 3 and 4, oil thereby surrounds the inside and outside circumferential surfaces 53 and 54. During shaft rotation, the inner fluid film IF1 is formed on the inside bearing surfaces 53 and shaft surface 21A. The outer bearing surfaces 54 also have the outer fluid films OF1 formed between the outer bearing surfaces 54 and the opposed housing surfaces 28. The outer and inner films IF1 and OF1 form between the inner and outer bearing surfaces 53 and 54 and the respective shaft surface 21A and chamber surface 28 so as to support radial loads during shaft rotation.

Bearing 51 has a monolithic or one-piece, cylindrical shape formed by a pair of bearing flanges 55 and 56 at the opposite ends which are joined together by a reduced-diameter intermediate bearing wall 57. The bearing wall 57 includes radially-open oil passages 58 which allow the above-described lubricating fluid or oil to flow from the in-feed passage 27-1 (FIG. 2) and the outer circumference of the bearing 51 to the inner circumference thereof. Preferably, the inner diameter of the wall 57 is greater than the inner diameter of the bearing flanges 55 and 56 so as to define an annular fluid chamber 60 located radially between the bearing wall 57 and the shaft 21. This chamber 60 collects oil therein and feeds fluid to the area of the bearing flanges 55 and 56.

The journal bearing 51 essentially has a first end 61 and a second end 62 which are each formed with anti-rotation features 65 as seen in FIGS. 3 and 4. The anti-rotation features 65 are recessed axially into the end faces of the first and second ends 61 and 62 to as to form recesses or notches which engage with a conventional anti-rotation clip 66 that prevents rotation of the journal bearing 51 relative to the bearing housing 23 during shaft rotation. An anti-rotation clip 66 is shown on both ends in FIG. 2, although it will be understood that preferably, only one such clip 66 is used, preferably towards the compressor side. The anti-rotation features are notches 65 formed the same on the first and second ends 61 and 62 in the preferred embodiment.

The aforementioned bearing flanges 55 and 56 are each defined by the inner bearing surface 53 associated therewith and the outer bearing surface 54. It will be noted that clock-wise rotation of the shaft 21 causes the outer shaft surface 21A to rotate or move relative to the stationery inner bearing surfaces 53. This relative movement between the opposed surfaces 21A and 53 generates formation of the fluid film there between as referenced above, wherein fluid flows from the fluid chamber 60. A rotational movement of the shaft surface 21A essentially draws or affects a circumferential flow of the lubricant or oil between the opposed bearing surfaces 53 and shaft surface 21A. These bearing surfaces 53 also are included with oppositely directed spiral grooves 63 and 64.

The spiral grooves 63 are provided on the inner bearing surface 53 on the first bearing end 61 and oriented so that the circumferential fluid flow is directed in the axial direction along the length of the shaft 21. Relative to FIG. 3, these spiral grooves 63 extend circumferentially in the counter-clockwise direction as viewed from the right end 62 and extend axially outwardly to an outer free end of the first bearing end 61 so that these spiral grooves 63 will generate a component of fluid flow that extends leftwardly in the axial direction as seen by flow arrows in FIG. 2. Relative to FIG. 1 therefore, the fluid flow from the left bearing end 61 would flow leftwardly from the fluid chamber 60 towards the compressor wheel 19 to assist in lubricating the components associated with such compressor wheel 19.

At the opposite bearing end 62, however, the spiral groove 64 has an oppositely directed spiral so that these spiral grooves 64 extend circumferentially in the clockwise direction as viewed from the right end 62 and extend axially outwardly to an outer free end of the first bearing end 62 wherein these spiral grooves 64 will generate a component of fluid flow that extends rightwardly in the axial direction as indicated by flow arrows in FIG. 2. Therefore, relative to FIG. 2, the same clockwise rotation of the shaft 21 causes the fluid film at this second bearing end 62 to flow rightwardly from the fluid chamber 60 towards the turbine wheel 18 (FIG. 1).

The opposite directions of the spiral grooves 63 and 64 thereby cause the lubricant fluid to flow in opposite directions, both leftwardly and rightwardly as the shaft 21 rotates clockwise which flow is illustrated in FIG. 2. The fluid chamber 60 is enlarged radially to ensure an adequate supply of fluid to the spiral grooves 63 and 64. The spiral grooves 63 and 64 serve the purpose of facilitating lubrication of the turbocharger components located axially adjacent to the opposite bearing ends 61 and 62.

However, the same function would not be accomplished if this shaft 21 was to rotate counter-clockwise when the bearing 51 is in the first orientation as shown in FIG. 3. If the shaft 21 rotated counterclockwise, then the respective spiral groove patterns 63 and 64 would direct fluid inwardly into the fluid chamber 60 defined by the intermediate bearing wall 57, which is undesirable. Hence, where the bearing unit 51 is in the first orientation, the shaft 21 is functional in the clockwise direction of rotation, but is non-functional in the counter-clockwise rotation, since the spiral grooves 63 and 64 would not function to direct lubricant from the fluid chamber 60 out of the bearing 61 and 62. Rather, the fluid would be pumped in the opposite inward direction which would quickly starve the bearing surfaces 53 and 54.

However, the bearing 51 can be rotated from the first orientation of FIG. 3 to the second orientation of FIG. 4. Essentially the bearing 51 is flipped end-wise or end-to-end and then mounted on the shaft 21. In this second orientation of FIG. 4, the same spiral groove 63 and 64 are now flipped to the opposite ends and are able to handle reverse rotation of the shaft 21. In particular, each of the spiral grooves 63 and 64 now extends outwardly in the axial direction but extends circumferentially in the respective counterclockwise and clockwise directions. In FIG. 4, the reverse rotation of the shaft 21 is indicated as counter-clockwise rotation, which is opposite to the clockwise rotation of shaft 21 in FIG. 3.

When the shaft rotates counterclockwise as indicated in FIG. 4, the spiral groove 63 and 64 are still able to function to redirect fluid flow from the fluid chamber 60 out of the opposite bearing ends 61 and 62 to generate the same flow shown in FIG. 2. In this regard, the fluid would flow out of the bearing end 62 towards the compressor wheel 19 (FIG. 1) and the fluid would flow out of the bearing end 61 towards the turbine wheel 18 (FIG. 1). The anti-rotation features 65 still function in the same manner to cooperate with the anti-rotation clip 66 so that no changes are required to affect installation of the journal bearing on the shaft 21.

Further, it is preferred that each spiral groove 63 and 64 extend at least one, and preferably more than one complete revolution about the inside circumference of the bearing flanges 55 and 56. For example, the spiral grooves 63 and 64 may extend more than 1.5 rotations, which ensures that the axial pumping effect generated by the spiral grooves 63 and 64 acts axially and continuously over the entire circumference of the flanges 55 and 56. Preferably, the spiral shape is a form of helix and the lead angle of each spiral groove 63 is an acute angle that is uniform along the entire length of the spiral groove 63. However, the lead angle may also be varied along the axial length to vary the pumping effects along the axial length of the bearing flanges 55 and 56. These features are believed to help distribute the axial pumping pressures more uniformly over the entire bearing circumference and help eliminate uneven fluid film pressures between the opposed surfaces 53 and 21A.

Figure 6:
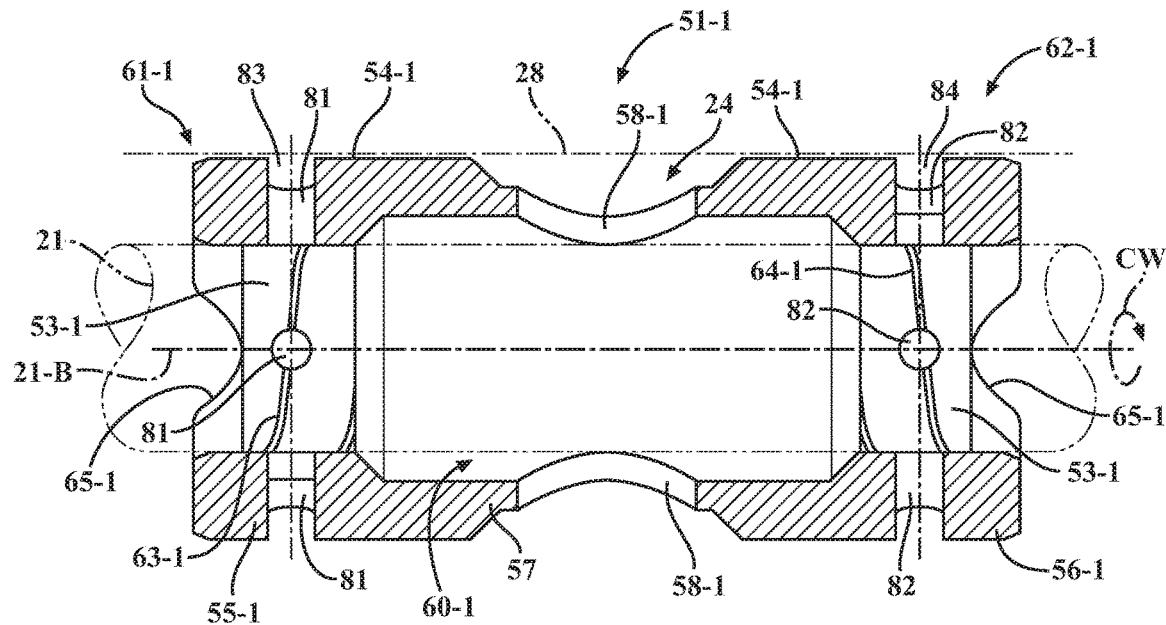
FIG. 6 is a side cross-sectional view of the second embodiment of the inventive journal bearing in the first orientation for use in a dual-feed bearing housing.
Figure 7:
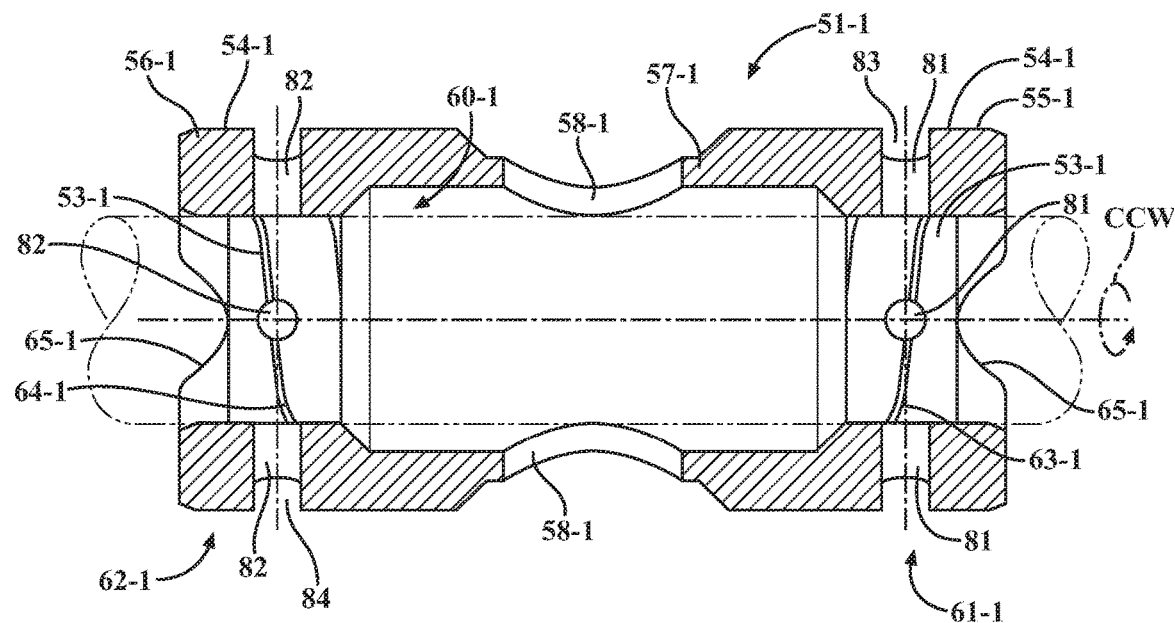
FIG. 7 is a side cross-sectional view of the second embodiment of the inventive journal bearing of FIG. 6 in a second orientation, which is flipped end-wise relative to said first orientation.

In a second embodiment of the invention as shown in FIGS. 5-7, the bearing unit is designated by reference numeral 51-1. The bearing unit 51-1 is structurally and functionally similar to bearing unit 51, wherein the following description will refer to parts of similar structure and function with a common reference numeral followed by "-1". The bearing unit 51-1 is preferably provided for a dual feed turbine configuration wherein axially spaced feed ports 27-2 are fed by the inlet passage 26 as shown in FIG. 5.

The bearing unit 51-1 (FIGS. 6 and 7) comprises the inner and outer bearing surfaces 53-1 and 54-1. The bearing unit 51-1 also floats freely within the bearing chamber 24 in surrounding relation to the shaft 21, wherein the outer bearing surfaces 54-1 allow formation of an outer fluid film OF2 (FIG. 5) therebetween.

The inner bearing surfaces 53-1 face inwardly toward the outer shaft surface 21A to allow formation of an inner fluid film IP2 (FIG. 5) therebetween. The combination of the inner and outer fluid films IF2 and OF2 provides support to the shaft 21 to counteract journal loads oriented radially relative to the shaft axis 21B.

As to the fluid film, the oil is supplied to the bearing chamber 24 from an inlet passage 26 (FIG. 1) which feeds the two oil feed ports 27-2 that supply oil to the journal bearing 51-1. The inner and outer fluid films IF2 and OF2 (FIG. 5) form between the inner and outer bearing surfaces 53-1 and 54-1 and the respective shaft surface 21A and chamber surface 28 so as to support radial loads during shaft rotation.

The bearing 51-1 has a monolithic or one-piece, cylindrical shape formed by the bearing flanges 55-1 and 56-1 the reduced-diameter intermediate bearing wall 57-1. The bearing 51-1 is designed for a dual oil feed turbocharger configuration, wherein bearing wall 57 includes enlarged, radially-open wall passages 58-1 that serve as drain ports which allow the above-described lubricating fluid or oil to flow out of the annular fluid chamber 60-1 which has been collected from the area of the bearing flanges 55-1 and 56-1 wherein this drainage flow is shown by the flow arrows DF of FIG. 5. This drainage flow DF exits the bottom of the turbocharger housing 24.

The first end 61-1 and a second end 62-2 of the bearing 50-1 are each formed with anti-rotation features 65-1 which engage with a conventional anti-rotational clip 64 (FIG. 2) that prevents rotation of the journal bearing 51-1.

As seen in FIGS. 6 and 7, the aforementioned bearing flanges 55-1 and 56-1 are each defined by the inner bearing surface 53-1 associated therewith and the outer bearing surface 54-1. To provide a dual feed configuration for allowing a flow of oil between these surfaces, the bearing flanges 55-1 and 56-1 respectively include flange feed passages 81 and 82, which extend radially between the inner and outer bearing surfaces 53-1 and 54-1, and annular channels 83 and 84, which open through the bearing surface 54-1 and fluidly communicate with the respective flange passages 81 and 82. The channels 83 and 84 and passages 81 and 82 locate near the feed ports 27-2 when installed as seen in FIG. 5. The channels 83 and 84 receive the fluid, such as oil therein, and allow a flow of such fluid through the flange passages 81 and 82 to provide fluid to the bearing surfaces 53-1 as shown by the fluid flow arrows of FIG. 5.

Here again, the rotational movement of the shaft surface 21A essentially draws or effects a circumferential flow of the lubricant or oil between the opposed bearing surfaces 53-1 and shaft surface 21A to generate the inner fluid film IF2. These bearing surfaces 53-1 also are included with oppositely directed spiral grooves 63-1 and 64-1, which are structurally and functionally the same as grooves 63 and 64 described above.

The spiral grooves 63-1 are provided on the first bearing end 61-1 and extend circumferentially in the clockwise direction as viewed from the right end 62-1 and extend axially outwardly to an outer free end of the first bearing end 61-1. These spiral grooves 63-1 generate a fluid flow that travels leftwardly in the axial direction from the fluid chamber 60-1 towards the compressor wheel 19 to assist in lubricating the components associated with such compressor wheel 19. The fluid is received from the adjacent feed port 27-2 and flows leftwardly due to the pumping of the spiral grooves 63-1. A portion of this flow may also flow rightwardly toward the fluid chamber 60-1 and then drain through the ports 58-1.

At the opposite bearing end 62-1, the spiral groove 64-1 has an oppositely directed spiral so that these spiral grooves 64-1 extend circumferentially in the counterclockwise direction as viewed from the right end 62-1 and extend axially outwardly to an outer free end of the first bearing end 62 wherein these spiral grooves 64-1 will generate a component of fluid flow that extends rightwardly in the axial direction. Therefore, relative to FIGS. 5 and 6, the same clockwise rotation of the shaft 21 causes the fluid film at this second bearing end 62-1 to flow rightwardly from the fluid chamber 60 towards the turbine wheel 18 (FIG. 1). Here again, a portion of this flow may also flow leftwardly toward the fluid chamber 60-1 and then drain through the ports 58-1.

The opposite counterclockwise and clockwise directions of the spiral grooves 63-1 and 64-1 thereby causes the lubricant fluid to flow in opposite directions, both rightwardly and leftwardly as the shaft 21 rotates counterclockwise to generate the inner fluid films IF2 at the opposite bearing ends. Here again, the fluid chamber 60-1 is enlarged radially to receive additional fluid that drains inwardly away from the spiral grooves 63-1 and 64-1.

As such, the bearing 51-1 can be rotated from the first orientation of FIG. 6 to the second orientation of FIG. 7. Essentially the bearing 51-1 is flipped end-wise or end-to-end and then mounted on the shaft 21. The anti-rotation features 65-1 cooperate with the anti-rotation clip 66 so that no changes are required depending upon which way the bearing 51-1 is flipped during installation.

Further, it is preferred that each spiral groove 63-1 and 64-1 extend at least one and preferably more than one complete revolution about the inside circumference of the bearing flanges 55-1 and 56-1. The flange fluid passages 81 and 82 preferably are circumferentially spaced apart and intersect with the spiral grooves 63-1 and 64-1 to better supply fluid in this area.

When in the second orientation of FIG. 7 and shaft rotation is changed to counterclockwise rotation, the fluid still flows along the same paths shown in FIG. 5.

Although particular preferred embodiments of the invention have been disclosed in detail for illustrative purposes, it will be recognized that variations or modifications of the disclosed apparatus, including the rearrangement of parts, lie within the scope of the present invention.

I claim:

1. A turbocharger including a compressor having a compressor wheel in a compressor housing, the compressor wheel having a direction of rotation for compression of air, a turbine having a turbine wheel in a turbine housing, a bearing housing (23) between said compressor housing and turbine housing, said bearing housing including an oil inlet passage (26) supplying a single oil feed port (27-1), a turbocharger shaft (21) connecting the compressor wheel and turbine wheel and adapted for rotation about a shaft axis (24B) and a floating journal bearing (51) which is provided within the bearing housing (23) to provide radial load support to the turbocharger shaft (21), said floating journal bearing (51) comprising;

a compressor side bearing end (61) having a first annular bearing flange (55) and a turbine side bearing end (62) having a second annular bearing flange (56), wherein said first and second bearing flanges (55, 56) are spaced axially apart by an annular bearing wall (57), said first bearing flange (55) defining an inner, bearing surface (53) and an outer bearing surface (54), said second bearing flange (56) defining an inner bearing surface (53) and an outer bearing surface (54) which inner and outer bearing surfaces (53, 54) respectively face radially inwardly and outwardly, wherein oil flows from the single oil feed port (27-1) axially outwards to each of the outer bearing surfaces (54) of the first and second bearing flange (55, 56) and from the single oil feed port (27-1) through radially-open oil passages (58) in said annular bearing wall (57) and axially outwards to each of the inner bearing surfaces (53) of the first and second bearing flange (55, 56), wherein each of said inner bearing surfaces (53) at said first and second bearing flange (55, 56) respectively has an axially inner end and an axially outer end and spiral grooves (63, 64) extending from said axially inner end to said axially outer end and axially open at said axially inner end and axially outer end, which spiral groove (63) at said first flange (55) inner bearing surface (53) is oppositely directed to said spiral groove (64) at said second flange (56) inner bearing surface (53') to cause lubricant fluid to flow in opposite directions and out of said bearing ends (61, 62) during shaft rotation in a first rotation direction, said journal bearing (51) being mountable in a first orientation wherein said spiral grooves (63, 64) are effective for shaft rotation in said first rotation direction, and mountable in a second orientation flipped end-to-end relative to said first orientation wherein said spiral grooves (63, 64) are effective for shaft rotation in a second rotation direction opposite said first rotation direction.

2. The turbocharger according to claim 1, wherein said spiral grooves (63, 64) extend circumferentially in said first orientation in opposite counterclockwise and clockwise directions as viewed from one of said bearing ends (61, 62), and said spiral grooves (63, 64) extend circumferentially in said second orientation in opposite clockwise and counterclockwise directions as viewed from the other one of said bearing ends (61, 62) when in said second orientation.

3. The turbocharger according to claim 2, wherein said first rotation direction is clockwise relative to said one of said bearing ends (61, 62) in said first orientation, and said second rotation direction being counterclockwise.

4. The turbocharger according to claim 1, wherein each of said spiral grooves (63, 64) extend at more than one complete revolution about an inside circumference of each of said bearing flanges (55, 56).

5. A turbocharger including a floating journal bearing (51) which is mounted within a bearing housing (23) of the turbocharger to provide radial load support to a turbocharger shaft (21), said journal bearing (51) comprising;

a first bearing end (61) having a first annular bearing flange (55) and a second bearing end (62) having a second annular bearing flange (56), wherein said first and second bearing flanges (55, 56) are joined axially together by an annular bearing wall (57), each of said first and second bearing flanges (55, 56) defining an inner bearing surface (53) and an outer bearing surface (54) which respectively face radially inwardly and outwardly and are configured to receive lubricant fluid therealong which forms inner and outer dynamic fluid films during shaft rotation to support radial journal loads on said journal bearing (51), wherein oil flows from a single oil feed port (27-1) axially outwards to each of the outer bearing surfaces (54) of the first and second bearing flange (55, 56) and from the single oil feed port (27-1) through radially-open oil passages (58) in said annular bearing wall (57) and axially outwards to each of the inner bearing surfaces (53) of the first and second bearing flange (55, 56), and wherein each of said inner bearing surfaces (53) at said first and second bearing flange (55, 56) respectively has an axially inner end and an axially outer end and spiral grooves (63, 64) extending from said axially inner end to said axially outer end and axially open at said axially inner end and axially outer end, which spiral groove (63) at said first flange (55) inner bearing surface (53) is oppositely directed to said spiral groove (64) at said second flange (56) inner bearing surface (53') to cause lubricant fluid to flow in opposite directions and out of said bearing ends (61, 62) during shaft rotation in a first rotation direction, wherein each of said spiral grooves (63, 64) extend at least one complete revolution about an inside circumference of each of said bearing flanges (55, 56).

6. The turbocharger according to claim 5, wherein said spiral grooves (63, 64) effect an axial pumping effect which acts axially and continuously over an entirety of said inside circumference of said bearing flanges (55, 56)), each of said spiral grooves (63, 64) having a spiral shape formed as a helix wherein a lead angle of each said spiral grooves (63, 64) is an acute angle that is uniform along an entire circumferential length thereof.

* * * * *